United States Patent
Marason et al.

(10) Patent No.: US 10,288,996 B1
(45) Date of Patent: May 14, 2019

(54) DISPLAY SHEETS WITH EMBOSSED MIRROR SURFACES

(71) Applicant: Amazon Technologies, Inc., Seattle, WA (US)

(72) Inventors: Eric Gifford Marason, San Francisco, CA (US); Tero Johannes Tuohioja, Espoo (FI); Juho Ilkka Jalava, Santa Clara, CA (US); Miguel Virgen, Santa Clara, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/380,338

(22) Filed: Dec. 15, 2016

(51) Int. Cl.
*G03B 21/602* (2014.01)
*G02B 27/01* (2006.01)
*G02B 1/14* (2015.01)

(52) U.S. Cl.
CPC ....... *G03B 21/602* (2013.01); *G02B 27/0101* (2013.01); *G02B 1/14* (2015.01); *G02B 2027/013* (2013.01)

(58) Field of Classification Search
CPC .................................................. G03B 21/602
USPC ........................................................ 359/459
See application file for complete search history.

(56) References Cited

U.S. PATENT DOCUMENTS

| | | | | |
|---|---|---|---|---|
| 1,535,985 A * | 4/1925 | Clark | ................... | G03B 21/602 359/459 |
| 5,696,625 A * | 12/1997 | Malifaud | ............. | G03B 21/602 359/459 |
| 7,274,508 B2 * | 9/2007 | Allen | ...................... | G03B 21/60 359/459 |
| 7,614,750 B2 * | 11/2009 | May | ........................ | G03B 21/56 353/29 |
| 8,700,097 B2 * | 4/2014 | Kim | ........................ | G06F 3/147 345/156 |
| 2008/0297895 A1 * | 12/2008 | Fujita | ..................... | G03B 21/60 359/459 |
| 2009/0231696 A1 * | 9/2009 | Shinbo | ................... | G03B 21/60 359/459 |
| 2010/0321592 A1 * | 12/2010 | Mikoshiba | ............. | G03B 21/60 348/789 |
| 2012/0113508 A1 * | 5/2012 | Coleman | ................. | G02B 27/26 359/459 |
| 2014/0036359 A1 * | 2/2014 | Jeon | ........................ | G03B 21/60 359/459 |
| 2017/0176846 A1 * | 6/2017 | Gorny | .................... | G03B 21/60 |

* cited by examiner

*Primary Examiner* — Christopher E Mahoney
(74) *Attorney, Agent, or Firm* — Eversheds Sutherland (US) LLP

(57) ABSTRACT

Systems, methods, and computer-readable media are disclosed for display sheets with angled mirror surfaces. In one embodiment, an example display sheet may include a first layer and a plastic layer coupled to the first layer. The plastic layer may include a first portion with a first set of mirrors embossed on a surface of the plastic layer, where the first set of mirrors comprises a first tilt angle and a first roll angle. The plastic layer may include a second portion with a second set of mirrors embossed on the surface, where the second set of mirrors comprises a second tilt angle and a second roll angle. The display sheet may be configured to reflect light in a horizontal field of view and a vertical field of view with respect to a projector positioned to direct light at the display sheet.

19 Claims, 8 Drawing Sheets

DISPLAY SHEETS WITH EMBOSSED MIRROR SURFACES

BACKGROUND

Electronic display devices may be used to provide information and content to users. However, in certain areas, providing electronic display devices may be difficult or undesirable due to the size and unaesthetic appearance of some electronic display devices. For example, positioning an electronic display device in front of a window may block a view through the window. In addition, viewability of display devices may be confined to certain fields of view and subject to low contrast in certain well-lit environments. Electronic displays that provide fields of view and are visible in different lighting conditions may therefore be desired. Such electronic displays may be positioned in various areas.

Figure 1:
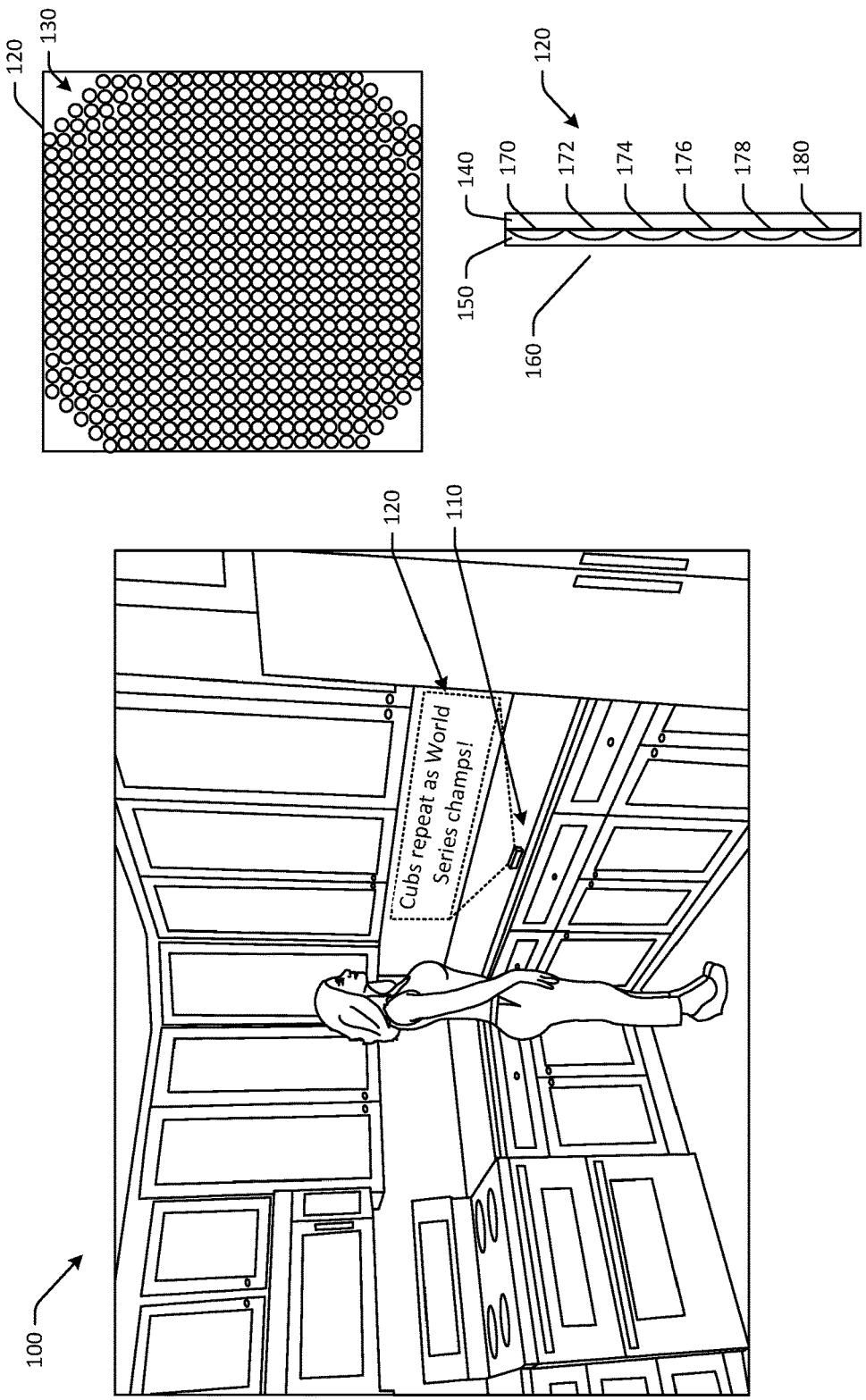
FIG. 1 is an example use case of a display sheet with embossed mirror surfaces in accordance with one or more embodiments of the disclosure.

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. The use of the same reference numerals indicates similar, but not necessarily the same or identical components. Different reference numerals may be used to identify similar components. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Overview

Display sheets or display screens may be used to present content, such as text, images, videos, and other content. Positioning display sheets at certain locations, such as kitchen backsplashes, windows, walls with limited surface area, and other locations may be difficult due to size and space requirements. Further, certain display sheets may provide confined or restricted visibility and/or may be subject to harsh ambient lighting environments. Embodiments of the disclosure include display sheets with embossed mirrors, or embossed mirror surfaces, that can be mounted in otherwise difficult locations, such as kitchen backsplashes, walls, windows, and other surfaces. The embossed mirrors may be micro-mirrors, or mirrors having dimensions of less than about 100 microns. Further, the display sheets may present content with increased brightness and widened fields of view, thereby allowing improved visibility from various locations about the display sheet, as well as in environments with significant ambient light. In some embodiments, the display sheets or display sheets may be used with a projector that is configured or positioned to direct light at the display sheet. The projector may be a pico projector, such as a handheld projector or another small, portable projector. The projector may be a short throw projector with a throw ratio of, for example, about 0.50 or less. The projector may therefore be positioned relatively close to the display sheet, compared to other projectors that are not short throw projectors. For example, the projector may be positioned 2 inches away from the display sheet. In some embodiments, the projector may be movable, while in other embodiments, the projector may be in a fixed position.

The display sheets with embossed mirrors or embossed mirror surfaces may be oriented in various angles and positions. For example, individual mirrors may be oriented with different angles of rotation about X or Y axes. Individual mirror orientations may be determined, in an example embodiment, based at least in part on a horizontal and vertical distance of the mirror from a center of the display sheet. The orientations of the embossed mirrors may therefore reflect projected light at different angles, which may increase horizontal and vertical fields of view, and may also increase brightness of displayed or presented content on the display sheet, as a result of specific mirror orientation. In addition, the embossed mirrors may redirect ambient light from certain angles away from, or at the outer edges of, a vertical field of view, thereby providing improved visibility in certain ambient environments. For example, a projector may be positioned or configured to direct light to the display sheet at a positive angle, or upwards towards the display sheet. The mirrors may be oriented such that light impinging on the display sheet from a negative angle, or downwards on the display sheet (e.g., light entering through a window, etc.) may be reflected to a bottom of a vertical field of view, where a user is unlikely to be viewing the display sheet. Viewability may therefore be improved.

This disclosure relates to, among other things, systems, methods, computer-readable media, techniques, and methodologies for display sheets with embossed mirror surfaces. Embodiments may include mirrors that are embossed on a surface of a display sheet at different orientations. Such embodiments may improve viewability, increase brightness, and provide improved fields of view. Certain embodiments may be clear or transparent display sheets that can be mounted to surfaces, while other embodiments may be integrated into surfaces, such as integrated into tiles, walls, and other surfaces. Embodiments of the disclosure may include clear or transparent displays that may be used with a projector to present content, such as text, images, or videos, on the displays. In some embodiments, display sheets may be mounted on surfaces such as glass windows, mirrors, walls, or other surfaces, such that while the projection system is not in operation, users can see through the clear or transparent display. Projectors may be positioned above or below the display sheet, such that the projector does not obstruct the display sheet. Embodiments of the disclosure may therefore provide displays that present content, such as text, images, videos, and the like, from a projector by reflecting light directed to the display sheet by the projector.

Embodiments of the disclosure may include projection systems with projectors and display sheets with embossed mirrors. Projectors of the projection systems may be short throw projectors configured to emit one or more wavelengths of light using light emitting diodes. In some embodiments, the projector may be a digital light processing (DLP) projector, such as a pico DLP projector. Projectors, as described herein, may include one or more light emitting diode light sources and DLP imaging technology, so as to provide compact and battery operable functionality. The light emitting diodes may be monochrome light emitting diodes. The light emitting diodes may include one or more of the following colors: violet, indigo, blue, green, red, ultraviolet, white, black, or another color. Certain embodiments may include additional or fewer light emitting diodes of different colors and/or wavelengths.

Referring to FIG. 1, an example display screen or display sheet 120 with embossed mirrors is depicted in a kitchen environment 100 in accordance with one or more embodiments of the disclosure. In FIG. 1, an example projection system may include a projector 110 and the display sheet 120. The projector 110 may a battery-powered projector that is configured to direct light through a projection lens. The display sheet 120 may be a reflective sheet that is configured to reflect the light from the projector. The display sheet 120 may be positioned such that a horizontal axis of the display sheet 120 is relatively higher than the project lens of the projector 110. The display sheet 120 may be mounted on a tile surface, a backsplash surface, or another surface in the kitchen environment 100. The display sheet 120 may be mounted via an adhesive, static, tape, a liquid optically clear adhesive, or another coupling or attachment method.

The projector 110 may direct light through a projection lens to the display sheet 120. The projector 110 may be connected, for example, wirelessly to one or more computing systems that provide content for presentation. The projector 110 may be positioned on a kitchen counter or another surface, and may be relatively close to the display sheet 120. For example, the projector 110 may be about 2 inches or about 4 inches away from the display sheet 120. The projector 110 may project content, such as weather information, calendar and appointment information, news, music titles, time and date information, order confirmation information, and other content onto the display sheet 120. For example, in FIG. 1, the projector 110 may project "Cubs repeat as World Series champs!" Content may be static or dynamic. For example, news headlines may continuously scroll over the display sheet 120. In the example of FIG. 1, the text portion of content may be rendered with a white background to improve readability. The projector 110 may be a battery operated short throw projector with a throw ratio of about 0.50 or less, in one example. A throw ratio may be determined by dividing a distance between the projector 110 and the display sheet 120 by a width of an image or content presented at the display sheet 120 (e.g., distance to image/width of image ≤0.50, in one example). The projector 110 may be configured to direct light upwards, or at a positive oblique projection angle, towards the display sheet 120. For example, the projection lens of the projector 110 may be positioned below a lower edge of the display sheet 120 in FIG. 1. The elevated image from the projector 110 may be achieved without keystone distortion by shifting the lens of the projector 110 upward with respect to its imager and, as described herein, by tilting the embossed mirrors of the display sheet 120. As a result, the projector body may not obstruct viewing angles, and the projector 110 can sit on a low table, a counter, or a shelf in the home. In some embodiments, the projector 110 may be positioned such that a horizontal axis of the reflective sheet or the display sheet 120 is relatively higher than the projection lens of the projector 110.

The display sheet 120 may be a reflective sheet screen that is embossed with one or more biconic mirrors or micromirrors. A biconic mirror may be a mirror with a horizontal radius of curvature that is different than its vertical radius of curvature. In some embodiments, the display sheet 120 may have mirrors with the same horizontal and vertical radii of curvature. The horizontal and vertical radii of curvature may form a pair of curvatures. The mirrors of the display sheet 120 may be embossed onto a surface of the display sheet 120. As shown in FIG. 1, the mirrors of the display sheet 120 may be arranged in a honeycomb arrangement 130. In the honeycomb arrangement 130, a greater number of mirrors may be embossed onto the display sheet 120 than, for example, a rectangular arrangement. Mirrors may be embossed across the entire display sheet surface or a portion of the display sheet surface 120. Some embodiments may include thousands of embossed mirrors.

The display sheet 120 may include one or more layers. For example, the display sheet 120 may include a plastic layer 140, a mirror layer 150, and an optional protective layer 160. The mirror layer 150 may be formed of aluminum or another material, and may be sprayed onto the plastic layer 140, may be a coating, or may be otherwise attached to the plastic layer 140, such as with an optically clear adhesive or liquid optically clear adhesive. The protective layer 160 may be a plastic layer or another cover layer that protects the mirror layer 150 from damage, such as oxidization. The plastic layer 140 may be formed of any suitable plastic, such as polycarbonate, polyethylene terephthalate, polyethylene naphthalate, polymethyl methacrylate, or another plastic. Other embodiments may include backing layers that are not formed of plastic or are partially formed of plastic. For example, other embodiments may include backing layers formed of glass, various liquids, resin, or other materials.

The plastic layer 140 may include one or more embossed mirrors. The mirrors may be embossed on the plastic layer 140. The mirrors may be convex mirrors and may be in contact with adjacent mirrors. In some embodiments, the mirrors may be concave mirrors, or a combination of convex and concave mirrors. The mirrors may form an array in some embodiments. The mirrors may be multi-pixel mirrors and may have, in one embodiment, a width of about 60 microns. Other embodiments may include mirrors with widths between about 5 and 80 microns. The individual mirrors may have the same or different geometries. For example, the individual mirrors may have hexagonal or circular geometries. As shown in cross-sectional view in FIG. 1, the plastic layer 140 may include a first mirror 170, a second mirror 172, a third mirror 174, a fourth mirror 176, a fifth mirror 178, and a sixth mirror 180. Some or all of the mirrors may have the same or different orientations. The mirrors may be oriented or tilted differently based at least in part on the individual mirror's location with respect to the oblique projection angle, or the angle at which light is projected from the projector to the display sheet 120. In some embodiments, the orientation of individual mirrors may be determined based at least in part on the respective mirror's distance from a center of the display sheet 120. In some instances, all of the mirrors within a certain portion or section of the display sheet 120 may have the same orientation, which may reduce complexity during manufacture. In FIG. 1, the third mirror 174 and the fourth mirror 176 may be positioned at or near a vertical center of the display sheet 120. As a result, the third mirror 174 and the fourth mirror 176 may not have vertical tilts, or tilts or rotations about an X axis or horizontal axis of the display sheet 120. The first mirror 170, however, may be tilted or oriented downward towards the vertical center of the display sheet 120. As the vertical distance between a mirror and the vertical center of the display sheet 120 increases, the respective mirror may be tilted further towards the vertical center. Similarly, as the horizontal distance between a mirror and the horizontal center of the display sheet 120 increases, the respective mirror may be tilted further towards the horizontal center. The individual mirrors may provide independent vertical and horizontal fields of view, and may provide clear sight of the projected information without obstruction by the projector 110 itself. The display sheet 120 may provide a brighter image than, for example, a white sheet screen, and may maintain contrast in certain ambient environments, such as in direct sunlight.

Light emitted from the projector 110 may impinge on the display sheet 120. The projected light may be projected at an angle from the projector 110 with respect to the display sheet 120. For example, the projected light may be projected at an oblique projection angle of about 70°. The projection angle and distance between the projector 110 and the display sheet 120 may affect a keystone distortion of content projected onto the display sheet 120.

The mirrors on the display sheet 120 may reflect the light from the projector 110. The orientation and/or tilting of the individual mirrors that are embossed on the display sheet 120 may reflect light in predetermined angles, which may create presented content with increased brightness and improved viewability due to the respective angles of reflection of the individual mirrors. The projector 110 may be configured to generate a relatively large image despite being positioned a short distance (e.g., a few inches, less than one foot, one foot, etc.) from the display sheet 120.

Because of the embossed mirrors at the display sheet, embodiments of the disclosure may provide electronic displays that can be used to present content at locations where electronic display devices, such as computer monitors or televisions, may have been impractical or unreasonable to position. Further, fields of view in both horizontal and vertical directions may be improved, and brightness of content may be increased. Display sheets of the disclosure may avoid loss of contrast in brightly lit ambient environments. Embodiments of the disclosure may increase or otherwise improve functionality of surfaces, such as windows, mirrors, walls, and other surfaces, by allowing the surface to double as an electronic display without the use of an electronic display device, such as a television, being mounted to the surface. Embodiments of the disclosure may further allow for projectors to be positioned relatively close to the display sheet, thereby reducing overall space consumption and increasing functionality in confined areas.

Example embodiments of the disclosure provide a number of technical features or technical effects. For example, in accordance with example embodiments of the disclosure, certain embodiments of the disclosure may present content on a display sheet with embossed mirrors. The embossed mirrors may be oriented at different angles in one or more of the horizontal or vertical directions. The embossed mirrors may reflect light from the projector at various angles, thereby creating improved fields of view, while the projector is positioned close to the display sheet, reducing space needed for the projection system. The above examples of technical features and/or technical effects of example embodiments of the disclosure are merely illustrative and not exhaustive.

One or more illustrative embodiments of the disclosure have been described above. The above-described embodiments are merely illustrative of the scope of this disclosure and are not intended to be limiting in any way. Accordingly, variations, modifications, and equivalents of embodiments disclosed herein are also within the scope of this disclosure. The above-described embodiments and additional and/or alternative embodiments of the disclosure will be described in detail hereinafter through reference to the accompanying drawings.

Illustrative Embodiments and Use Cases

Figure 2:
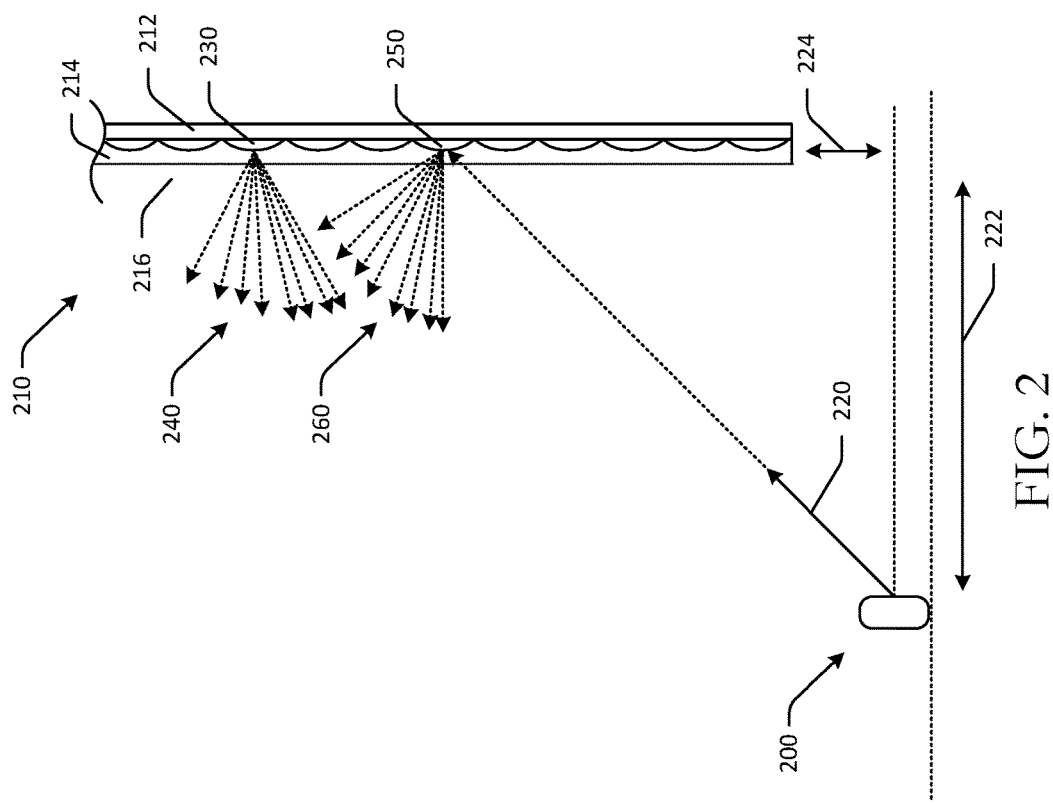
FIG. 2 is a cross-sectional view of a display sheet with embossed mirror surfaces and a projector device in accordance with one or more embodiments of the disclosure.

Referring to FIG. 2, a projection system with a projector and a display sheet with embossed mirror surfaces is depicted in accordance with one or more embodiments of the disclosure. The projection system may include a projector 200 and a display sheet 210. The projector 200 may be the same projector as the projector illustrated in FIG. 1. The display sheet 210 may be the same display sheet as the display sheet illustrated in FIG. 1. The display sheet 210 may be mounted on any suitable surface, such as a window, a mirror, a wall, or may be suspended from a ceiling or mounted to a floor.

The projector 200 may be a short throw projector. A short throw projector, in one example, may be a projector with an imaging lens having a throw ratio of equal to or less than about 0.50 distance to width ratio. The projector 200 may be a DLP projector. The projector 200 may be configured to direct or project light at a projection angle 220. The projection angle 220 may be a positive oblique projection angle. The projection angle 220 illustrated in FIG. 2 may be a positive projection angle. The projection angle 220 may be fixed or may be adjustable. The projector 200 may direct light at the projection angle 220 towards the display sheet 210. The projector 200 may include one or more light emitting diodes that can be activated or otherwise used to generate light. For example, the projector 200 may include one or more monochrome light emitting diodes or one or more other light emitting diodes. Any number of light emitting diodes may be included.

The projector 200 may be positioned relatively lower than the display sheet 210. For example, the projector 200 may be positioned such that the projection lens of the projector 200 is at or below a bottom edge of the display sheet 210. The projector 200 may be positioned a first distance 222 from the display sheet 210. The first distance 222 may be a relatively short distance, such as about 2 inches, about 4 inches, less than a foot, a foot, or another distance. The projection lens of the projector, or an origination of the light from the projector, may be positioned a second distance 224 from a bottom of the display sheet 210. The second distance 224 may be equal to or greater than 0 inches, or about 2 inches, or about 6 inches, or another distance. Accordingly, the projector 200 may not obstruct a view of the display sheet 210.

The display sheet 210 may have a diagonal length of about 20 inches in one embodiment. The display sheet 210 may include a backing layer 212, a reflective layer 214, and an optional protective layer 216. The optional protective layer 216 may be a cover layer or cover sheet that protects the display sheet 210, or, more specifically, that protects the reflective layer 214 and/or the backing layer 212 from damage. The reflective layer 214 may be formed of any suitable reflective material, such as aluminum. The reflective layer 214 may be adhered or otherwise coupled to the backing layer 212. Specifically, the reflective layer 214 may be coupled to a surface of the backing layer 212 that includes one or more mirrors. In some embodiments, the reflective layer 214 may be a coating or may be sprayed onto the backing layer 212. The optional protective layer 216 may be coupled to the reflective layer 214. The backing layer 212 may be a layer that is coupled to a mounting surface, such as a wall or a mirror. The backing layer 212 may be formed partially or fully of a plastic material. Other embodiments may have backing layers formed of other materials, such as glass.

The backing layer 212 may include one or more convex mirrors formed on a surface of the backing layer 212 between the reflective layer 214 and the surface of the backing layer 212. The convex mirrors may be micro-mirrors and may have a width equal to or greater than about 5 microns and equal to or less than about 80 microns. For example, the convex mirrors may have a width of about 60 microns. The convex mirrors may be embossed on one or more surfaces of the backing layer 212. For example, the convex mirrors may be formed from the same plastic or other material that forms the backing layer 212. The convex mirrors may have specific orientations and may be configured to reflect light in certain directions.

For example, the display sheet 210 may include a first convex micro-mirror 230 that is positioned or oriented at a certain X rotation and a certain Y rotation, such that light reflecting from the first convex micro-mirror 230 is reflected in a first set of directions 240. A curvature of the first convex micro-mirror 230, as well as the orientation of the first convex micro-mirror 230 and the positioning of the projector 200 may determine the specific first set of directions 240. Similarly, a second convex micro-mirror 250 may be oriented or positioned such that light that reflects from the second convex micro-mirror 250 may be reflected in a second set of directions 260. While the first convex micro-mirror 230 and the second convex micro-mirror 250 may have the same curvature or pair of curvatures, the orientations of the respective mirrors may be different, resulting in the difference in the respective reflective directions. As illustrated in FIG. 2, the first convex micro-mirror 230 may reflect a portion of light downward, while the second convex micro-mirror 250 may direct less light downwards. The directions of reflection may be based at least in part on the orientations of the individual mirrors or sets of mirrors.

One or more angles of incidence between light emanating from a single point at the projector 200 to various points at the display sheet 210 may be used to determine specific mirror orientation. For example, light emanating from the projector 2000 may impinge the display sheet 210 at different angles of incidence. The angles of incidence may be used to determine the specific tilt and/or roll angles for respective mirrors or regions of mirrors.

Figure 3:
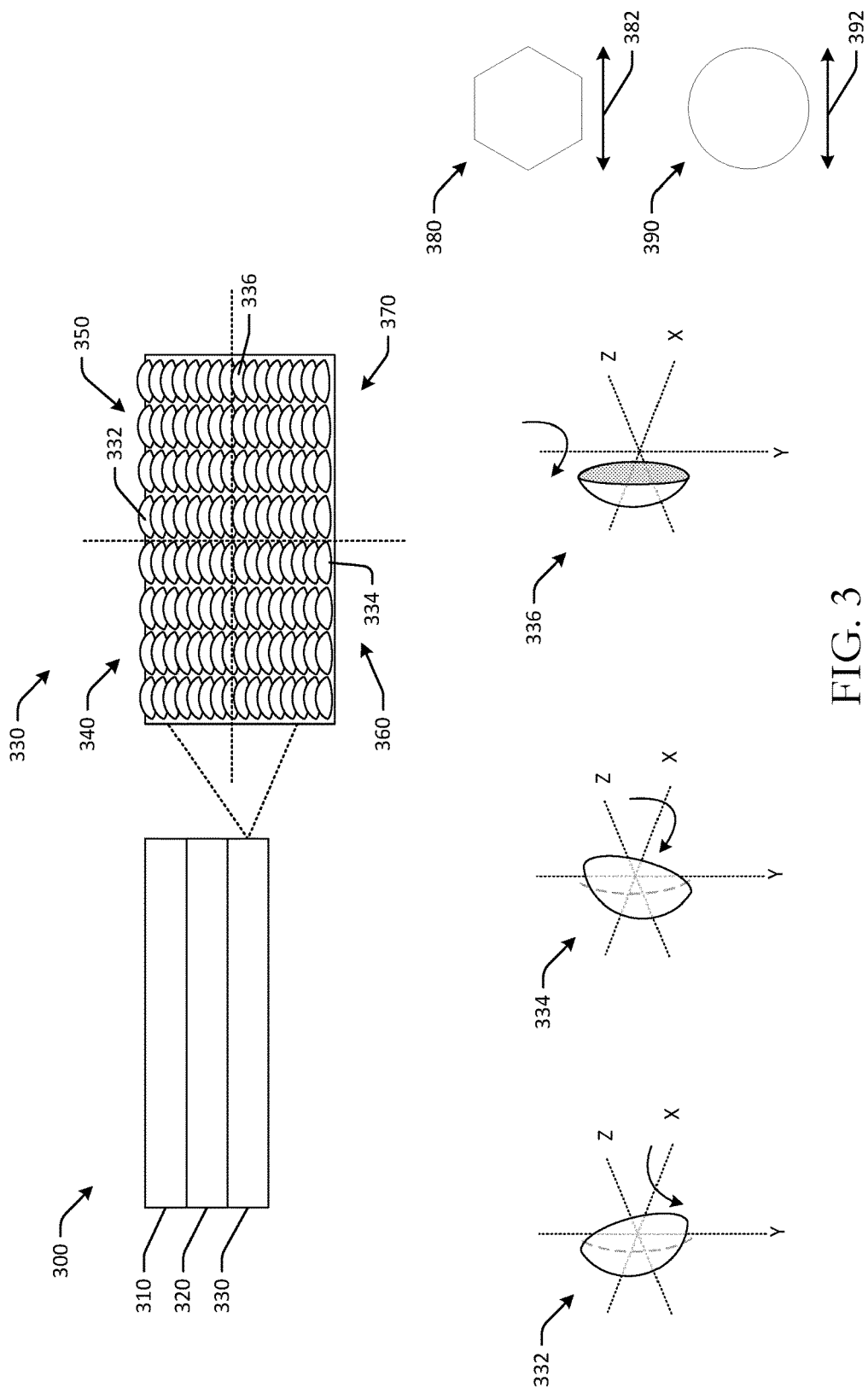
FIG. 3 is a schematic drawing of a display sheet with embossed mirror surfaces, and individual mirrors in various orientations in accordance with one or more embodiments of the disclosure.

FIG. 3 illustrates a display sheet 300 with embossed mirror surfaces and individual mirrors in various orientations in accordance with one or more embodiments of the disclosure. The display sheet 300 may be the same display as FIGS. 1-2.

The display sheet 300 may include a first layer 310, a second layer 320, and a third layer 330. The display sheet 300 may have a thickness of about 0.5 millimeters. One or more layers of the display sheet 300 may be coupled with an optically clear adhesive, such as a liquid optically clear adhesive, or with another adhesive. Optically clear adhesive may be in liquid or non-liquid form. Liquid optically clear adhesive may be liquid-based and may improve optical characteristics of the display sheet 300, as well as durability. Liquid optically clear adhesives may be conformal and/or less firm than other adhesives, and may therefore bind to non-even surfaces.

The first layer 310 may be a cover layer, and may be formed from plastic in one example. The first layer 310 may be a protective cover layer or a cover film that may be optically clear. The first layer 310 may be formed from plastic or glass, for example, and may form an outer or outermost layer of the display sheet 300. In certain embodiments, the display sheet 300 may include one or more touch layers with one or more resistive and/or capacitive touch sensors, thereby allowing the display sheet 300 to receive touch input. Users may therefore make selections or provide inputs via the one or more touch layers. In some embodiments, one or more layers of the display sheet 300 may include surface features, such as diffusers, grooves, grating, dimples, lenses, planar surfaces, concave surfaces, convex surfaces, and so forth, which may be used to enhance or attenuate the transmission of light.

The second layer 320 may be a reflective layer, and may be formed from aluminum in one example. The third layer 330 may be a plastic layer and may be formed from, or at least partially formed from, a suitable plastic material. One or more of the layers may have equal or different thicknesses.

The third layer 330 may include one or more embossed mirrors or embossed mirror surfaces on a surface of the third layer 330. The mirrors may be embossed on the surface of the third layer 330. The embossed mirrors may, for example, be carved, molded, or stamped onto the third layer 330, such that individual mirrors extend from a surface of the mirror, or are formed on the surface of the third layer 330. The mirrors may be formed, for example, during an extrusion process for formation of the third layer 330, or during a reel-to-reel process of forming the third layer 330. In the reel-to-reel process, a lacquer layer may be applied to a film and cured against a tool with the embossed mirror pattern. Other methods of manufacture may be used, including stamping processes, laser cutting processes, and other processes. The mirrors may be formed in a hexagonally packed arrangement, or a honeycomb arrangement, so as to fit a maximum number of mirrors onto the surface of the third layer 330. The mirrors may reflect light impinging at a positive oblique projection angle, or coming in an upwards direction, in a vertical field of view and a horizontal field of view. The individual mirrors may reflect light in individual fields of view that may overlap, or at least partially overlap, fields of view of other mirrors that are embossed on the surface.

The individual mirrors may have specific orientations. Some mirrors may have the same orientation, while other mirrors may have different orientations. For example, in some embodiments, each individual mirror may have different orientations, while in other embodiments, mirrors within a certain region of the surface of the third layer 330 may have the same orientation, thereby increasing tolerance and reducing complexity of manufacture.

For example, in FIG. 3, the third layer 330 may include a first portion 340, a second portion 350, a third portion 360, and a fourth portion 370. Each portion may include a set of one or more mirrors. The third layer 330 may include additional or fewer portions. Each of the mirrors within a portion may have the same orientation in the illustrated embodiment. In FIG. 3, the third layer 330 may be split into the four portions, as illustrated, where the center of the third layer 330 is defined by the intersection of the horizontal and vertical axes illustrated in FIG. 3.

The second portion 350 may include a first convex micro-mirror 332. The first convex micro-mirror 332 may be embossed on the surface of the third layer 330. The first convex micro-mirror 332 may be positioned at a first tilt angle with respect to the horizontal axis of the third layer 330, and at a first roll angle with respect to a vertical axis of the third layer 330. Specifically, in FIG. 3, the first convex micro-mirror 332 is illustrated in isolation. The first convex micro-mirror 332 may be positioned at a first tilt angle, or a first angle of rotation about the X axis, or the horizontal axis, of the third layer 330. The first tilt angle may be downward towards the X axis, since the first convex micro-mirror 332 is positioned above the X axis. The first convex micro-mirror 332 may be positioned at a first roll angle, or a first angle of rotation about the Y axis, or the vertical axis, of the third layer 330. The first roll angle may be slightly towards the Y axis. Since the first convex micro-mirror 332 is positioned relatively close to the vertical axis, the first roll angle may be a relatively flat angle. The first tilt angle may affect the vertical field of view of light reflected by the first convex micro-mirror 332, and the first roll angle may affect the horizontal field of view of light reflected by the first convex micro-mirror 332. Each of the mirrors in the second portion 350 may have the same first tilt angle and first roll angle in some embodiments, while in other embodiments, each mirror may have an independent tilt and/or roll angle.

The third portion 360 may include a second convex micro-mirror 334. The second convex micro-mirror 334 may be embossed on the surface of the third layer 330. The second convex micro-mirror 334 may be positioned at a second tilt angle with respect to the horizontal axis of the third layer 330, and at a second roll angle with respect to the vertical axis of the third layer 330. Specifically, in FIG. 3, the second convex micro-mirror 334 is illustrated in isolation. The second convex micro-mirror 334 may be positioned at a second tilt angle, or a second angle of rotation about the X axis, or the horizontal axis, of the third layer 330. The second tilt angle may be upward towards the X axis, since the second convex micro-mirror 334 is positioned below the X axis. The second convex micro-mirror 334 may be positioned at a second roll angle, or a second angle of rotation about the Y axis, or the vertical axis, of the third layer 330. The second roll angle may be slightly towards the Y axis. Since the second convex micro-mirror 334 is positioned relatively close to the vertical axis, the second roll angle may be a relatively flat tilt angle. The second tilt angle may affect the vertical field of view of light reflected by the second convex micro-mirror 334, and the second roll angle may affect the horizontal field of view of light reflected by the second convex micro-mirror 334. The second tilt angle may be different than the first tilt angle, and the second roll angle may be different than the first roll angle, due to the difference in positioning of the respective first and second convex micro-mirrors with respect to the horizontal and vertical axes of the third layer 330. The first convex micro-mirror 332 and the second convex micro-mirror 334 may be configured to reflect light in horizontal and/or vertical fields of view that at least partially overlap each other. Each of the mirrors in the third portion 360 may have the same second tilt angle and second roll angle in some embodiments, while in other embodiments, each mirror may have an independent tilt and/or roll angle.

The fourth portion 370 may include a third convex micro-mirror 336. The third convex micro-mirror 336 may be embossed on the surface of the third layer 330. The third convex micro-mirror 336 may be positioned at a third tilt angle with respect to the horizontal axis of the third layer 330, and at a third roll angle with respect to the vertical axis of the third layer 330. Specifically, in FIG. 3, the third convex micro-mirror 336 is illustrated in isolation. The third convex micro-mirror 336 may be positioned at a third tilt angle, or a third angle of rotation about the X axis, or the horizontal axis, of the third layer 330. The third tilt angle may be relatively flat, since the third convex micro-mirror 336 is positioned near the X axis. The third convex micro-mirror 336 may be positioned at a third roll angle, or a third angle of rotation about the Y axis, or the vertical axis, of the third layer 330. The third roll angle may be towards the Y axis. Since the third convex micro-mirror 336 is positioned relatively far from the vertical axis, the third roll angle may be greater than the roll angles of the first and/or second convex micro-mirrors 342, 334. The third tilt angle may affect the vertical field of view of light reflected by the third convex micro-mirror 336, and the third roll angle may affect the horizontal field of view of light reflected by the third convex micro-mirror 336. The third tilt angle may be different than the first and/or second tilt angles, and the third roll angle may be different than the first and/or second roll angles, due to the difference in positioning of the respective first, second, and third convex micro-mirrors with respect to the horizontal and vertical axes of the third layer 330. The first convex micro-mirror 332, second convex micro-mirror 334, and third convex micro-mirror 336 may be configured to reflect light in horizontal and/or vertical fields of view that at least partially overlap each other. Each of the mirrors in the fourth portion 370 may have the same third tilt angle and third roll angle in some embodiments, while in other embodiments, each mirror may have an independent tilt and/or roll angle.

In one example, specific orientation values for individual mirrors may be determined based at least in part on a mirror's horizontal and vertical distance from a center of a display sheet. In one example, horizontal and vertical distance from a center of a display sheet may be determined by calculating or determining a distance between a center point of the mirror, and a distance between the center point and a horizontal axis of the display sheet and a distance between the center point and the vertical axis of the display sheet. In one embodiment, the tilt angle, or the rotation about the X axis, for a mirror may be determined by the following formula, where Y is the vertical distance between the mirror and the vertical axis:

$$\text{Tilt Angle} = -2\times(Y/127)^2 + 10\times(Y/127) - 0.5$$

Accordingly, where a mirror is positioned a first vertical distance from a center point of the display sheet, the tilt angle for that mirror may be a function of the first vertical distance between the center point of the display sheet and the mirror. A positive tilt angle value may indicate that a top side of the mirror is to rotate outward about the X axis, while a negative tilt angle may indicate that a bottom side of the mirror is to rotate outwards about the X axis.

In one embodiment, the roll angle, or the rotation about the Y axis, for a mirror may be determined by the following formula, where X is the horizontal distance between the mirror and the horizontal axis:

$$\text{Roll Angle} = 20.2 \times (X/229)$$

Accordingly, where a mirror is positioned a first horizontal distance from a center point of the display sheet, the roll angle for that mirror may be a function of the first horizontal distance between the center point of the display sheet and the mirror. A positive roll angle value may indicate that a right side of the mirror is to rotate outwards about the Y axis, while a negative roll angle may indicate that a left side of the mirror is to rotate outwards about the Y axis. Therefore, the tilt and/or roll angles for different mirrors may be different due to the mirrors respective positioning with respect to the horizontal and vertical axes.

In embodiments where the mirrors in a certain section or portion of the display sheet 300 have the same orientation, the specific orientation for those mirrors may be determined based at least in part on what the orientation would be for a mirror positioned in the center of a respective region or section. For example, if the mirrors in the first portion 340 had the same orientation, the orientation may be determined by determining an orientation for a mirror that would be positioned at a horizontal and vertical center of the first portion 340, and applying that orientation to each of the mirrors in the first portion 340.

The micro-mirrors that are embossed on the surface of the third layer 330 may have any suitable geometry. For example, the micro-mirrors may have a hexagonal geometry 380, with a width 382 of about 60 microns in one embodiment. In another embodiment, the micro-mirrors may have a circular geometry 390, with a width 392 of about 80 microns. Other configurations and geometries may be used for convex micro-mirrors.

Figure 4:
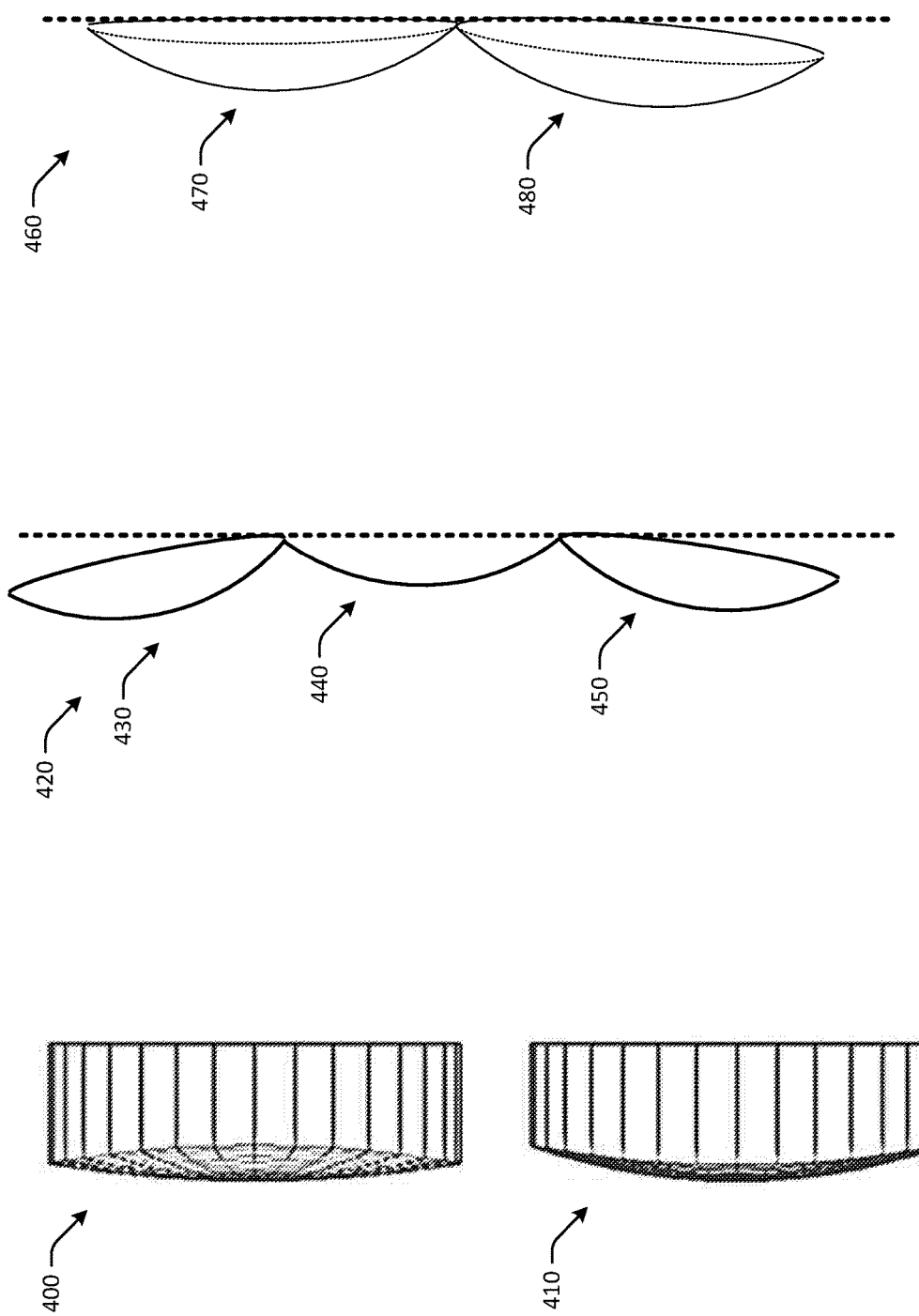
FIG. 4 is a side view of embossed mirrors with different radii and in various orientations in accordance with one or more embodiments of the disclosure.

FIG. 4 is a side view of embossed mirrors with different radii and in various orientations in accordance with one or more embodiments of the disclosure. The embossed mirrors may be embossed on surfaces of display sheets. The embossed mirrors may be biconic mirrors. Specifically, the embossed mirrors may have a horizontal radius of curvature that is different than a vertical radius of curvature.

A first micro-mirror is illustrated in a horizontal cross-sectional view 400 and in a vertical cross-sectional view 410 in FIG. 4. The first micro-mirror may have a vertical radius of curvature that is about 180 microns. The first micro-mirror may have a horizontal radius of curvature that is about 90 microns. The horizontal radius of curvature may be a function of the diameter of the mirror (e.g., 1.5×, 2×, etc.). As illustrated in the vertical cross-sectional view 400 and the horizontal cross-sectional view 410, the vertical radius of curvature may be significantly greater than the horizontal radius of curvature (e.g., double, etc.). As a result, the horizontal field of view may be relatively greater or increased (e.g., about 160 degrees, etc.), while the vertical field of view may be relatively smaller or reduced (e.g., about 80 degrees, etc.). By reducing the vertical field of view, the image gain over the screen may be increased.

FIG. 4 includes a first set of one or more convex mirrors 420 with a first convex mirror 430, a second convex mirror 440, and a third convex mirror 450. The first convex mirror 430 may be positioned above a horizontal axis of a display sheet, and may therefore reflect a first portion of incident light from a positive angle or an upward angle in a first vertical field of view that is at least partially directed towards the horizontal axis. The first convex mirror 430 may therefore be tilted out and away from the backing layer and towards the horizontal axis. The second convex mirror 440 may be positioned at the horizontal axis, and may therefore be positioned flat against the backing layer. The second convex mirror 440 may reflect a second portion of the incident light from the positive angle in a second vertical field of view that at least partially overlaps the first vertical field of view. The third convex mirror 450 may be positioned below the horizontal axis and may therefore be titled upwards or towards the horizontal axis, similar to the first convex mirror 430, but at an opposite angle.

Similarly, a second set of one or more convex mirrors 460 may include a first convex mirror 470 that is tilted towards a vertical axis of a display sheet, but is positioned along the horizontal axis and is therefore not tilted in the X direction. The second set of one or more convex mirrors 460 may include a second convex mirror 480 that is tilted towards the vertical axis of a display sheet, and since it is positioned below the horizontal axis, the second convex mirror 480 may also be tilted upwards in the X direction.

Figure 5:
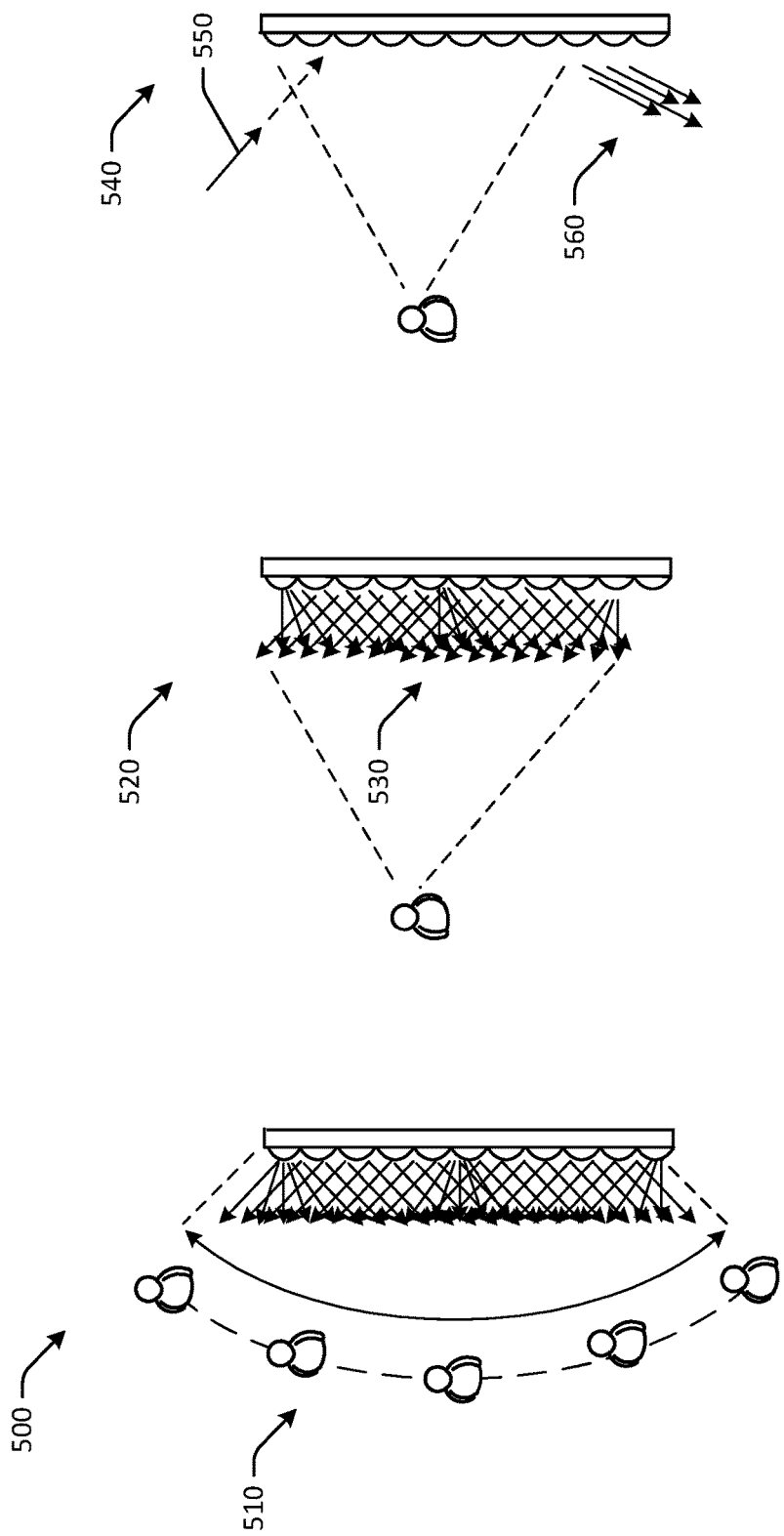
FIG. 5 is a schematic drawing of horizontal and vertical fields of view for a display sheet with embossed mirror surfaces in accordance with one or more embodiments of the disclosure.

FIG. 5 is a schematic drawing of horizontal and vertical fields of view for a display sheet with embossed mirror surfaces in accordance with one or more embodiments of the disclosure. In a top view 500, a display sheet may include one or more embossed mirrors that reflect light in a horizontal field of view 510. The horizontal field of view 510 may be a region from which a user may be able to view light reflected from the display sheet. The horizontal field of view 510 may be about 160 degrees. Accordingly, the display sheet may be visible by users from many locations within a room or other environment. The embossed mirrors of the display sheet may also improve or increase brightness due to the embossed mirrors. In addition, a brightness level of the display sheet may remain relatively constant across the entire horizontal field of view 510.

FIG. 5 includes a side view 520, in which the display sheet includes multiple embossed mirrors with individual vertical fields of view 530. The vertical fields of view 530 may form a vertical field of view from which a user may be able to view light reflected from the display sheet. The vertical field of view of the display sheet may be a function of the vertical fields of view 530 or reflected light attributed to the individual mirrors. The display sheet may provide a vertical field of view of about 80 degrees.

As shown in use case 540, the embossed mirrors of the display sheet may be oriented so as to reject ambient or incident light that impinges on the display sheet. For example, sunlight entering an ambient environment and impinging on the screen at a negative projection angle 550 may be directed outside of the vertical field of view. Specifically, light impinging at a negative projection angle 550, which may be any angle greater than 0 degrees, or downwards onto the display sheet (e.g., 30 degrees, 45 degrees, etc.) may be reflected by one or more of the individual mirrors to an outside 560 of the vertical field of view. Because incident light, such as sunlight or overhead lighting, enters a room from an angle above horizontal, the mirrors may be oriented to reflect it out of the vertical field of view, thereby preserving image contrast. Accordingly, the display sheet may provide images that are bright due to a high reflectance coefficient (albedo) and a solid angle of pixel flux that is smaller than $2\pi$ radians, thereby providing a brighter pixel.

Figure 6:
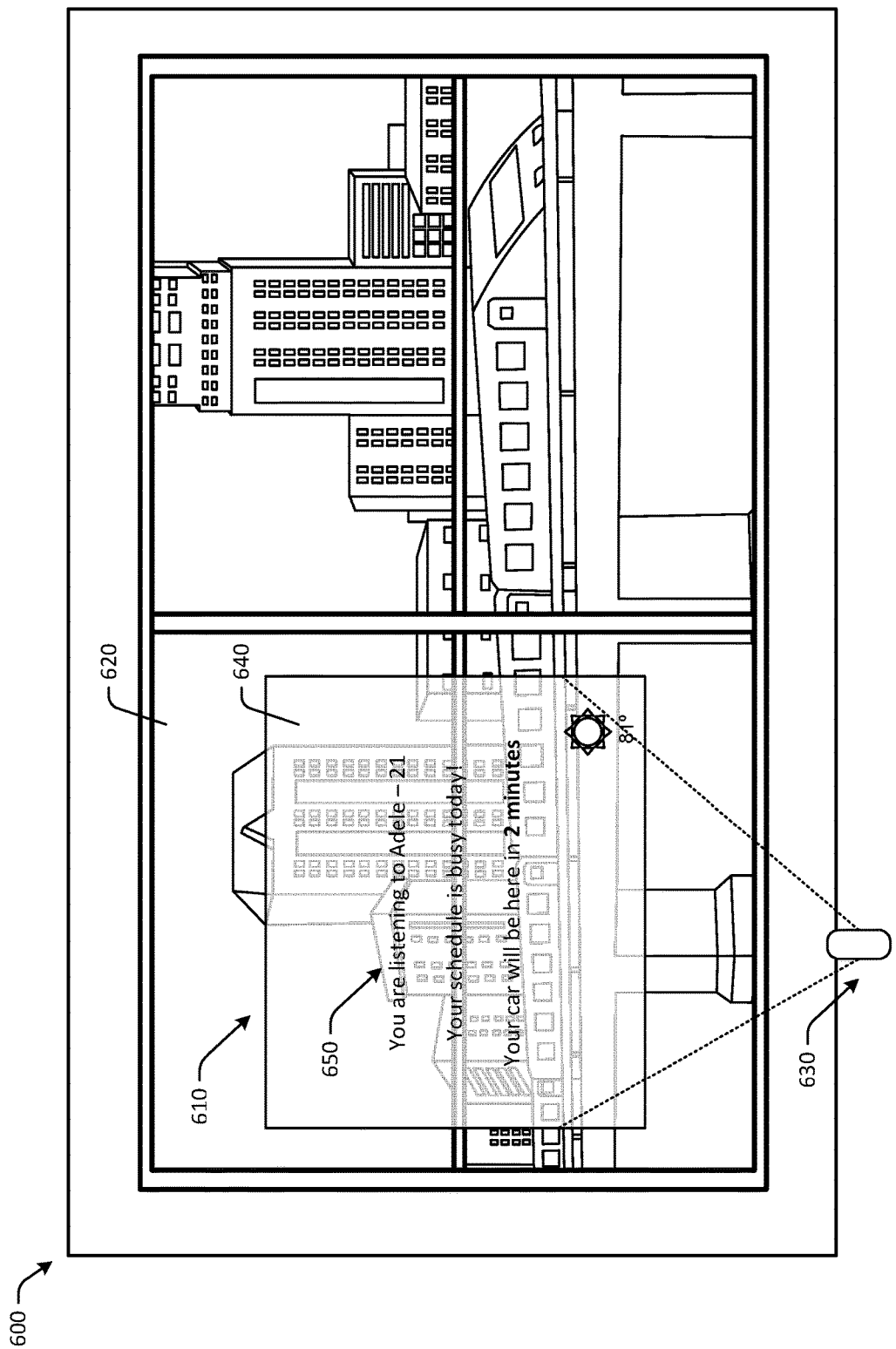
FIG. 6 is an example use case of a display sheet with embossed mirror surfaces mounted to a window in accordance with one or more embodiments of the disclosure.

FIG. 6 is an example use case 600 of a display sheet 610 with embossed mirror surfaces 640 mounted to a window 620 in accordance with one or more embodiments of the disclosure. A projector 630 may be positioned to direct light onto the display sheet 610. The projector 630 may be a battery-powered projector configured to direct light through a projection lens, and may include one or more monochrome light emitting diodes.

The display sheet 610 may be adhered to the glass window surface 620. The display sheet 610 may include one or more embossed mirror surfaces 640 that may be spread across the display sheet 610 in a hexagonal or other arrangement. The display sheet 610 may include a clear plastic layer on which the mirrors are embossed, a reflective layer adjacent to the plastic layer, and a clear flat layer. The clear flat layer may be a flat plastic layer adhered to the reflective layer. In some embodiments, a protective layer may be optionally coupled to the clear flat layer. The reflective layer may be made or formed of aluminum that is at least partially transmissive or translucent and at least partially reflective. For example, a thickness of the reflective layer may be determined such that about 50% of light is reflected by the reflective layer (e.g., 50% transparent, etc.), and about 50% of light passes through the reflective layer, thereby allowing users to see through the display sheet 610. As a result, the view through the window is not fully obstructed by the display sheet 610. In some embodiments, the display sheet 610 may include a semi-reflective layer to allow viewing through the display sheet 610 and/or a glass surface. The semi-reflective layer may have a reflectance greater than or equal to about 3% and/or less than or equal to about 90%.

The projector 630 may be positioned so as to project content onto the display sheet 610. The projector 630 may direct light onto the display sheet 610 using a projection lens. The projection lens may be positioned at least about 2 inches or at least about 4 inches from the display sheet 610 and may be configured to project light at a projection oblique angle of about 45° relative to a central horizontal axis of the display sheet 610. Because the projector 630 may be a short throw projector, distance between the projection lens and the display sheet 610 may be minimized, and positioning of the projector 630 with respect to the display sheet 610 may be unobtrusive and aesthetically pleasing.

During use, the projector 630 may receive content and may project the content 650 using light emitting diodes onto the display sheet 610. For example, in FIG. 6, the projector 630 may present information related to currently playing music, calendar information, taxi or car ride information and pick up times, and weather information. Other information or content may be presented.

Figure 7:
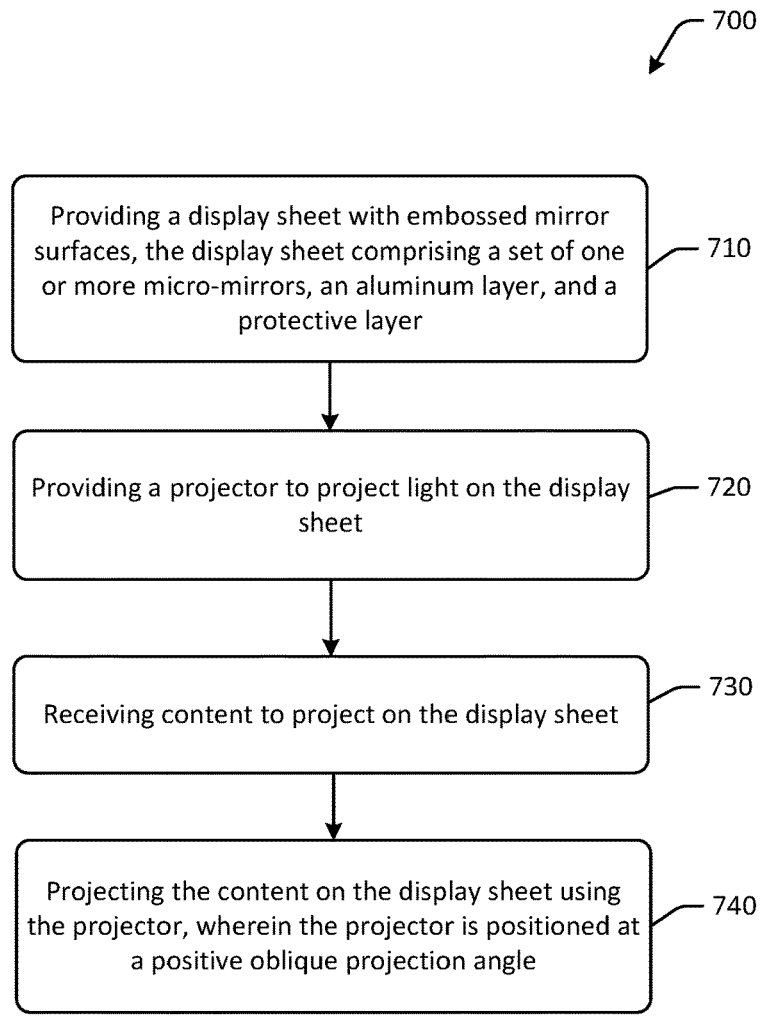
FIG. 7 is an example process flow for presenting content at display sheets with embossed mirror surfaces in accordance with one or more embodiments of the disclosure.

FIG. 7 depicts an example process flow 700 for providing and/or presenting content at display sheets with embossed mirror surfaces in accordance with one or more example embodiments of the disclosure. The following operations may be performed in any order. Block 710 of the process flow 700 includes providing a display sheet with embossed mirror surfaces, the display sheet comprising a set of one or more micro-mirrors, an aluminum layer, and a protective layer. Block 720 includes providing a projector to project light on the display sheet. Block 730 includes receiving content to project on the display sheet. The content may be a color image, text, video, or other content. Block 740 includes projecting the content on the display sheet using the projector, wherein the projector is positioned at a positive oblique projection angle. The positive oblique projection angle may indicate that the projector is projecting light upwards towards the display sheet, or that the projector is positioned relatively lower than a bottom of the display sheet. In some embodiments, the process flow 700 may further include operations of projecting the content on the display sheet. Certain embodiments may include operations of detecting motion using a motion sensor, and activating the projector. For example, certain embodiments may include motion-activated projection systems that are initiated or triggered upon detecting motion.

It should be noted, that the process 700 may be modified in various ways in accordance with certain embodiments of the disclosure. For example, one or more operations of process 700 may be eliminated or executed out of the illustrated order in other embodiments of the disclosure. Additionally, other operations may be added to process 700 in accordance with other embodiments of the disclosure.

One or more operations of the methods, process flows, or use cases of FIGS. 1-7 may have been described above as being performed by a projector, or more specifically, by one or more program module(s), applications, or the like executing on a device. It should be appreciated, however, that any of the operations of the methods, process flows, or use cases of FIGS. 1-7 may be performed, at least in part, in a distributed manner by one or more other devices, or more specifically, by one or more program module(s), applications, or the like executing on such devices. In addition, it should be appreciated that the processing performed in response to execution of computer-executable instructions provided as part of an application, program module, or the like may be interchangeably described herein as being performed by the application or the program module itself or by a device on which the application, program module, or the like is executing. While the operations of the methods, process flows, or use cases of FIGS. 1-7 may be described in the context of the illustrative devices, it should be appreciated that such operations may be implemented in connection with numerous other device configurations.

The operations described and depicted in the illustrative methods, process flows, and use cases of FIGS. 1-7 may be carried out or performed in any suitable order, such as the depicted orders, as desired in various example embodiments of the disclosure. Additionally, in certain example embodiments, at least a portion of the operations may be carried out in parallel. Furthermore, in certain example embodiments, less, more, or different operations than those depicted in FIGS. 1-7 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Illustrative Computer Architecture

Figure 8:
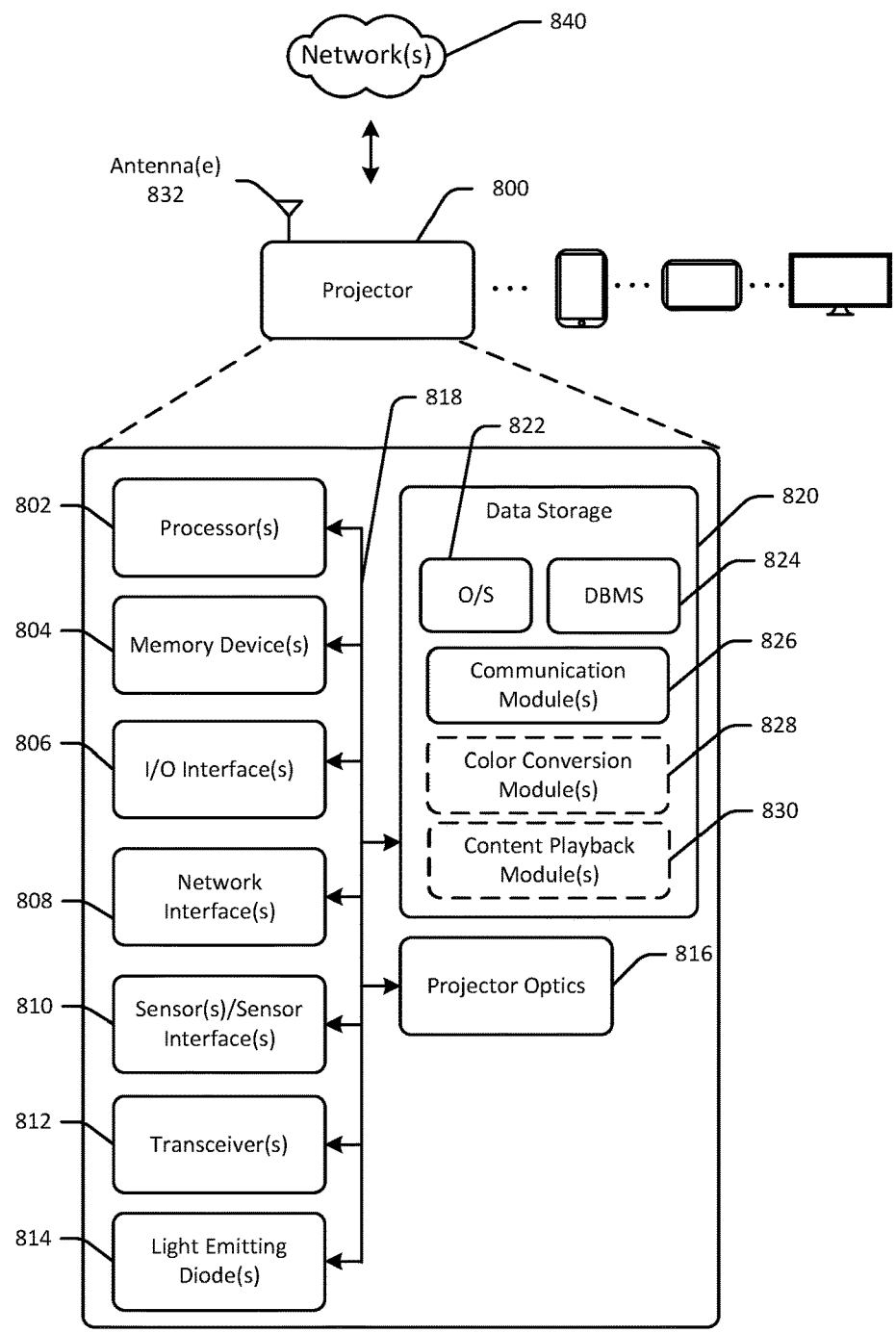
FIG. 8 is a schematic block diagram of an illustrative projector in accordance with one or more embodiments of the disclosure.

FIG. 8 is a schematic block diagram of an illustrative projector 800 in accordance with one or more example embodiments of the disclosure. The projector 800 may include or may be in communication with any suitable computing device including, but not limited to, a server system, a camera or camera system, a mobile device such as a smartphone, tablet, e-reader, wearable device, or the like; a desktop computer; a laptop computer; a content streaming device; a set-top box; or the like. The projector 800 may correspond to an illustrative device configuration for the projection devices or projectors of FIGS. 1-7.

The projector 800 may be configured to communicate via one or more networks 840, such as an Internet of Things network, with one or more servers, user devices, or the like. Such network(s) may include, but are not limited to, any one or more different types of communications networks such as, for example, Internet of Things networks, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the projector 800 may include one or more processors (processor(s)) 802, one or more memory devices 804 (generically referred to herein as memory 804), one or more input/output ("I/O") interface(s) 806, one or more network interface(s) 808, one or more sensors or sensor interface(s) 810, one or more transceiver(s) 812, one or more light emitting diode(s) 814, projector optics 816, and data storage 820. The projector 800 may further include one or more bus(es) 818 that functionally couple various components of the projector 800. The projector 800 may further include one or more antenna(e) 832 that may include, without limitation, a cellular antenna for transmitting or receiving signals to/from a cellular network infrastructure, an antenna for transmitting or receiving Wi-Fi signals to/from an access point (AP), a Global Navigation Satellite System (GNSS) antenna for receiving GNSS signals from a GNSS satellite, a Bluetooth antenna for transmitting or receiving Bluetooth signals, a Near Field Communication (NFC) antenna for transmitting or receiving NFC signals, and so forth. These various components will be described in more detail hereinafter.

The bus(es) 818 may include at least one of a system bus, a memory bus, an address bus, or a message bus, and may permit exchange of information (e.g., data (including computer-executable code), signaling, etc.) between various components of the projector 800. The bus(es) 818 may include, without limitation, a memory bus or a memory controller, a peripheral bus, an accelerated graphics port, and so forth. The bus(es) 818 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

The memory 804 of the projector 800 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 804 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 804 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 820 may include removable storage and/or non-removable storage including, but not limited to, magnetic storage, optical disk storage, and/or tape storage. The data storage 820 may provide non-volatile storage of computer-executable instructions and other data. The memory 804 and the data storage 820, removable and/or non-removable, are examples of computer-readable storage media (CRSM) as that term is used herein.

The data storage 820 may store computer-executable code, instructions, or the like that may be loadable into the memory 804 and executable by the processor(s) 802 to cause the processor(s) 802 to perform or initiate various operations. The data storage 820 may additionally store data that may be copied to memory 804 for use by the processor(s) 802 during the execution of the computer-executable instructions. Moreover, output data generated as a result of execution of the computer-executable instructions by the processor(s) 802 may be stored initially in memory 804, and may ultimately be copied to data storage 820 for non-volatile storage.

More specifically, the data storage 820 may store one or more operating systems (O/S) 822, one or more database management systems (DBMS) 824, and one or more program modules, applications, engines, computer-executable code, scripts, or the like such as, for example, one or more communication module(s) 826, one or more optional color conversion module(s) 828, and one or more optional content playback module(s) 830. Some or all of these modules may be sub-modules. Any of the components depicted as being stored in data storage 820 may include any combination of software, firmware, and/or hardware. The software and/or firmware may include computer-executable code, instructions, or the like that may be loaded into the memory 804 for execution by one or more of the processor(s) 802. Any of the components depicted as being stored in data storage 820 may support functionality described in reference to correspondingly named components earlier in this disclosure.

The data storage 820 may further store various types of data utilized by components of the projector 800. Any data stored in the data storage 820 may be loaded into the memory 804 for use by the processor(s) 802 in executing computer-executable code. In addition, any data depicted as being stored in the data storage 820 may potentially be stored in one or more datastore(s) (not shown) and may be accessed via the DBMS 824 and loaded in the memory 804 for use by the processor(s) 802 in executing computer-executable code. The datastore(s) may include, but are not limited to, databases (e.g., relational, object-oriented, etc.), file systems, flat files, distributed datastore(s) in which data is stored on more than one node of a computer network, peer-to-peer network datastore(s), or the like.

The processor(s) 802 may be configured to access the memory 804 and execute computer-executable instructions loaded therein. For example, the processor(s) 802 may be configured to execute computer-executable instructions of the various program modules, applications, engines, or the like of the projector 800 to cause or facilitate various operations to be performed in accordance with one or more embodiments of the disclosure. The processor(s) 802 may include any suitable processing unit capable of accepting data as input, processing the input data in accordance with stored computer-executable instructions, and generating output data. The processor(s) 802 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 802 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 802 may be capable of supporting any of a variety of instruction sets.

Referring now to functionality supported by the various program modules depicted in FIG. 8, the communication module(s) 826 may include computer-executable instructions, code, or the like that responsive to execution by one or more of the processor(s) 802 may perform functions including, but not limited to, sending and/or receiving information, such as receiving content information for presentation or projection on a clear display.

The optional color conversion module(s) 828 may include computer-executable instructions, code, or the like that responsive to execution by one or more of the processor(s) 802 may perform functions including, but not limited to, converting color information for content from a default color information to a modified color information based at least in part on the light emitting diode(s) and the related emission wavelengths available at the projector 800.

The content playback module(s) 830 may include computer-executable instructions, code, or the like that responsive to execution by one or more of the processor(s) 802 may perform functions including, but not limited to, initiating projection or presentation of content at the projector 800 onto a display sheet with embossed mirror surfaces.

Referring now to other illustrative components depicted as being stored in the data storage 820, the O/S 822 may be loaded from the data storage 820 into the memory 804 and may provide an interface between other application software executing on the projector 800 and hardware resources of the projector 800. More specifically, the O/S 822 may include a set of computer-executable instructions for managing hardware resources of the projector 800 and for providing common services to other application programs (e.g., managing memory allocation among various application programs). In certain example embodiments, the O/S 822 may control execution of one or more of the program modules depicted as being stored in the data storage 820. The O/S 822 may include any operating system now known or which may be developed in the future including, but not limited to, any server operating system, any mainframe operating system, or any other proprietary or non-proprietary operating system.

The DBMS 824 may be loaded into the memory 804 and may support functionality for accessing, retrieving, storing, and/or manipulating data stored in the memory 804 and/or data stored in the data storage 820. The DBMS 824 may use any of a variety of database models (e.g., relational model, object model, etc.) and may support any of a variety of query languages. The DBMS 824 may access data represented in one or more data schemas and stored in any suitable data repository. In certain example embodiments, the DBMS 824 may be any suitable light-weight DBMS optimized for performance on a mobile device.

Referring now to other illustrative components of the projector 800, the input/output (I/O) interface(s) 806 may facilitate the receipt of input information by the projector 800 from one or more I/O devices as well as the output of information from the projector 800 to the one or more I/O devices. The I/O devices may include any of a variety of components such as a display or display sheet having a touch surface or touchscreen; an audio output device for producing sound, such as a speaker; an audio capture device, such as a microphone; an image and/or video capture device, such as a camera; a haptic unit; and so forth. Any of these components may be integrated into the projector 800 or may be separate. The I/O devices may further include, for example, any number of peripheral devices such as data storage devices, printing devices, and so forth.

The I/O interface(s) 806 may also include an interface for an external peripheral device connection such as universal serial bus (USB), FireWire, Thunderbolt, Ethernet port or other connection protocol that may connect to one or more networks. The I/O interface(s) 806 may also include a connection to one or more of the antenna(e) 832 to connect to one or more networks via a wireless local area network (WLAN) (such as Wi-Fi) radio, Bluetooth, and/or a wireless network radio, such as a radio capable of communication with a wireless communication network such as a Long Term Evolution (LTE) network, WiMAX network, 3G network, etc.

The projector 800 may further include one or more network interface(s) 808 via which the projector 800 may communicate with any of a variety of other systems, platforms, networks, devices, and so forth. The network interface(s) 808 may enable communication, for example, with a wireless router, a host server, and/or one or more web servers via one or more network(s).

The antenna(e) 832 may include any suitable type of antenna depending, for example, on the communications protocols used to transmit or receive signals via the antenna(e) 832. Non-limiting examples of suitable antenna(e) may include directional antenna(e), non-directional antenna(e), dipole antenna(e), folded dipole antenna(e), patch antenna(e), multiple-input multiple-output (MIMO) antenna(e), or the like. The antenna(e) 832 may be communicatively coupled to one or more transceivers 812 or radio components to which or from which signals may be transmitted or received.

As previously described, the antenna(e) 832 may include a cellular antenna configured to transmit or receive signals in accordance with established standards and protocols, such as Global System for Mobile Communications (GSM), 3G standards (e.g., Universal Mobile Telecommunications System (UMTS), Wideband Code Division Multiple Access (W-CDMA), CDMA2000, etc.), 4G standards (e.g., Long-Term Evolution (LTE), WiMax, etc.), direct satellite communications, or the like.

The antenna(e) 832 may additionally, or alternatively, include a Wi-Fi antenna configured to transmit or receive signals in accordance with established standards and protocols, such as the IEEE 802.11 family of standards, including via 2.4 GHz channels (e.g. 802.11b, 802.11g, 802.11n), 5 GHz channels (e.g. 802.11n, 802.11ac), or 60 GHZ channels (e.g. 802.11ad). In alternative example embodiments, the antenna(e) 832 may be configured to transmit or receive radio frequency signals within any suitable frequency range forming part of the unlicensed portion of the radio spectrum.

The antenna(e) 832 may additionally, or alternatively, include a GNSS antenna configured to receive GNSS signals from three or more GNSS satellites carrying time-position information to triangulate a position therefrom. Such a GNSS antenna may be configured to receive GNSS signals from any current or planned GNSS such as, for example, the Global Positioning System (GPS), the GLONASS System, the Compass Navigation System, the Galileo System, or the Indian Regional Navigational System.

The transceiver(s) 812 may include any suitable radio component(s) for—in cooperation with the antenna(e) 832—transmitting or receiving radio frequency (RF) signals in the bandwidth and/or channels corresponding to the communications protocols utilized by the projector 800 to communicate with other devices. The transceiver(s) 812 may include hardware, software, and/or firmware for modulating, transmitting, or receiving—potentially in cooperation with any of antenna(e) 832—communications signals according to any of the communications protocols discussed above including, but not limited to, one or more Wi-Fi and/or Wi-Fi direct protocols, as standardized by the IEEE 802.11 standards, one or more non-Wi-Fi protocols, or one or more cellular communications protocols or standards. The transceiver(s) 812 may further include hardware, firmware, or software for receiving GNSS signals. The transceiver(s) 812 may include any known receiver and baseband suitable for communicating via the communications protocols utilized by the projector 800. The transceiver(s) 812 may further include a low noise amplifier (LNA), additional signal amplifiers, an analog-to-digital (A/D) converter, one or more buffers, a digital baseband, or the like.

The sensor(s)/sensor interface(s) 810 may include or may be capable of interfacing with any suitable type of sensing device such as, for example, inertial sensors, force sensors, positioning sensors, thermal sensors, temperature sensors, humidity sensors, location sensors, and so forth. Example types of inertial sensors may include accelerometers (e.g., MEMS-based accelerometers), gyroscopes, and so forth.

The light emitting diode(s) 814 may be configured to emit light at one or more wavelengths, and at various colors. For example, the light emitting diode(s) may include one or more of a blue light emitting diode(s), an indigo light emitting diode(s), a violet light emitting diode(s), an ultra-violet light emitting diode(s), or another color and/or wavelength.

The projector optics 816 may include any suitable optics configured to project content from the projector 800. For example, the projector optics 816 may include one or more mirrors, one or more dichroic filters, one or more collectors/collimating lenses, one or more homogenizing optics (e.g., fly's eye array, etc.), one or more relay optics, one or more digital micro-mirror devices, one or more projection lens systems, and/or additional or fewer optics components.

It should be appreciated that the program modules, applications, computer-executable instructions, code, or the like depicted in FIG. 8 as being stored in the data storage 820 are merely illustrative and not exhaustive and that processing described as being supported by any particular module may alternatively be distributed across multiple modules or performed by a different module. In addition, various program module(s), script(s), plug-in(s), Application Programming Interface(s) (API(s)), or any other suitable computer-executable code hosted locally on the projector 800, and/or hosted on other computing device(s) accessible via one or more networks, may be provided to support functionality provided by the program modules, applications, or computer-executable code depicted in FIG. 8 and/or additional or alternate functionality. Further, functionality may be modularized differently such that processing described as being supported collectively by the collection of program modules depicted in FIG. 8 may be performed by a fewer or greater number of modules, or functionality described as being supported by any particular module may be supported, at least in part, by another module. In addition, program modules that support the functionality described herein may form part of one or more applications executable across any number of systems or devices in accordance with any suitable computing model such as, for example, a client-server model, a peer-to-peer model, and so forth. In addition, any of the functionality described as being supported by any of the program modules depicted in FIG. 8 may be implemented, at least partially, in hardware and/or firmware across any number of devices.

It should further be appreciated that the projector 800 may include alternate and/or additional hardware, software, or firmware components beyond those described or depicted without departing from the scope of the disclosure. More particularly, it should be appreciated that software, firmware, or hardware components depicted as forming part of the projector 800 are merely illustrative and that some components may not be present or additional components may be provided in various embodiments. While various illustrative program modules have been depicted and described as software modules stored in data storage 820, it should be appreciated that functionality described as being supported by the program modules may be enabled by any combination of hardware, software, and/or firmware. It should further be appreciated that each of the above-mentioned modules may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other modules. Further, one or more depicted modules may not be present in certain embodiments, while in other embodiments, additional modules not depicted may be present and may support at least a portion of the described functionality and/or additional functionality. Moreover, while certain modules may be depicted and described as sub-modules of another module, in certain embodiments, such modules may be provided as independent modules or as sub-modules of other modules.

One or more operations of the methods, process flows, and use cases of FIGS. 1-7 may be performed by a device having the illustrative configuration depicted in FIG. 8, or more specifically, by one or more engines, program modules, applications, or the like executable on such a device. It should be appreciated, however, that such operations may be implemented in connection with numerous other device configurations.

The operations described and depicted in the illustrative methods and process flows of FIGS. 1-7 may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in FIGS. 1-7 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed is:

1. A projection system comprising:
    a battery-powered projector configured to direct light through a projection lens; and
    a reflective sheet configured to reflect the light, the reflective sheet comprising:
        a plastic layer having a surface, the plastic layer comprising:
            a first portion of the surface comprising a first set of convex micro-mirrors arranged in a hexagonal configuration about a perimeter of the first portion, wherein perimeters of individual convex micro-mirrors in the first set have circular geometries, the first set of convex micro-mirrors comprising a first convex micro-mirror embossed on the surface, wherein the first convex micro-mirror comprises a top portion and a right side portion, and the first convex micro-mirror is positioned at a first tilt angle with respect to a horizontal axis of the plastic layer, and at a first roll angle with respect to a vertical axis of the plastic layer;
            a second portion of the surface adjacent to the first portion, the second portion comprising a second set of convex micro-mirrors arranged in a hexagonal configuration about a perimeter of the first portion, wherein perimeters of individual convex micro-mirrors in the second set have circular geometries, the second set of convex micro-mirrors comprising a second convex micro-mirror embossed on the surface, wherein the second convex micro-mirror comprises a bottom portion and a left side portion, and the second convex micro-mirror is positioned at a second tilt angle with respect to the horizontal axis, and at a second roll angle with respect to the vertical axis;
        an aluminum layer adhered to the surface of the plastic layer; and
        a protective layer adhered to the aluminum layer;
    wherein the reflective sheet is positioned such that the horizontal axis of the plastic layer is relatively higher than the projection lens, such that the light from the projector is directed at an oblique projection angle upward towards the reflective sheet.

2. The projection system of claim 1, wherein a first center point of the first convex micro-mirror is positioned at a first vertical distance from the horizontal axis, and the first tilt angle is a function of the first vertical distance, such that the first tilt angle increases as the first vertical distance increases;
    wherein the first center point is positioned at a first horizontal distance from the vertical axis, and the first roll angle is a function of the first horizontal distance, such that the first roll angle increases as the first horizontal distance increases;
    wherein a second center point of the second convex micro-mirror is positioned at a second vertical distance from the horizontal axis, and the second tilt angle is a function of the second vertical distance, such that the second tilt angle increases as the second vertical distance increases; and
    wherein the second convex micro-mirror is positioned at a second horizontal distance from the vertical axis, and the second roll angle is a function of the second horizontal distance, such that the second roll angle increases as the second horizontal distance increases.

3. The projection system of claim 1, wherein the first convex micro-mirror is configured to reflect a third portion of the light in a vertical field of view with respect to the projection lens; and
    wherein the first convex micro-mirror directs ambient light impinging on the first convex micro-mirror from above the horizontal axis outside the vertical field of view.

4. A display sheet comprising:
a first layer; and
a plastic layer coupled to the first layer, the plastic layer comprising:
   a first portion comprising a first set of mirrors embossed on a surface of the plastic layer, wherein the first set of mirrors comprises a first tilt angle and a first roll angle, and wherein perimeters of individual mirrors in the first set of mirrors have a circular geometry; and
   a second portion comprising a second set of mirrors embossed on the surface, wherein the second set of mirrors comprises a second tilt angle and a second roll angle, wherein perimeters of individual mirrors in the second set of mirrors have a circular geometry;
wherein the first set of mirrors and the second set of mirrors are arranged in a hexagonal configuration about a perimeter of the combined first portion and second portion, and wherein the display sheet is configured to reflect light in a horizontal field of view and a vertical field of view.

5. The display sheet of claim 4, wherein the first layer is reflective and comprises aluminum, the display sheet further comprising a protective layer adjacent to the first layer.

6. The display sheet of claim 4, wherein the first set of mirrors comprises a first mirror, and the second set of mirrors comprises a second mirror;
   wherein the first tilt angle is based at least in part on a function of a first vertical distance between a center point of the surface and a first center point of the first mirror;
   wherein the first roll angle is based at least in part on a function of a first horizontal distance between the center point of the surface and the first center point;
   wherein the second tilt angle is based at least in part on a function of a second vertical distance between the center point and a second center point of the second mirror; and
   wherein the second roll angle is based at least in part on a function of a second horizontal distance between the center point and the second center point.

7. The display sheet of claim 4, wherein the second tilt angle is greater than the first tilt angle, and wherein the second roll angle is greater than the first roll angle.

8. The display sheet of claim 4, wherein the first set of mirrors comprises a first mirror that reflects a first portion of incident light that impinges on the first mirror from a first angle that is below a horizontal axis of the display sheet in a first vertical field of view; and
   wherein the second set of mirrors comprises a second mirror that reflects a second portion of the incident light that impinges on the second mirror from the first angle in a second vertical field of view that at least partially overlaps the first vertical field of view.

9. The display sheet of claim 8, wherein the first mirror reflects a third portion of the incident light in a first horizontal field of view; and
   wherein the second mirror reflects a fourth portion of the incident light in a second horizontal field of view that at least partially overlaps the first horizontal field of view.

10. The display sheet of claim 8, wherein the first mirror reflects incident light that impinges on the first mirror from a second angle that is above a horizontal axis of the display sheet outside of the first vertical field of view; and
   wherein the second mirror reflects incident light from the negative angle to an outer portion of the second vertical field of view.

11. The display sheet of claim 4, wherein the plastic layer and the first set of mirrors comprises a same material.

12. The display sheet of claim 4, wherein the first set of mirrors comprises mirrors having a first pair of curvatures, and wherein the second set of mirrors comprises mirrors having the first pair of curvatures.

13. The display sheet of claim 4, wherein the display sheet is mounted to a glass surface, and wherein the first layer is a semi-reflective layer having a reflectance of greater than or equal to about 3% and less than or equal to about 90%.

14. The display sheet of claim 4, wherein the first set of mirrors comprises convex mirrors and wherein the second set of mirrors comprises convex mirrors.

15. A display screen comprising:
   a surface having embossed mirrors in a hexagonal arrangement about a perimeter of the embossed mirrors, the surface comprising a first mirror embossed in the surface in a first orientation and having a circular perimeter geometry, and a second mirror embossed in the surface in a second orientation and having a circular perimeter geometry, wherein the first mirror reflects light impinging at a positive oblique projection angle from below a horizontal axis of the surface in a first vertical field of view, and wherein the second mirror reflects light impinging at the positive oblique projection angle in a second vertical field of view that at least partially overlaps the first vertical field of view.

16. The display screen of claim 15, wherein the first mirror reflects light impinging on the display screen at a negative projection angle from above the horizontal axis outside the first vertical field of view, and wherein the second mirror reflects light impinging at the negative projection angle outside the second vertical field of view.

17. The display screen of claim 15, wherein the first orientation comprises a first tilt angle that is greater than zero degrees with respect to a vertical axis of the display screen, and a first roll angle that is greater than zero degrees with respect to the horizontal axis; and
   wherein the second orientation comprises a second tilt angle with respect to the vertical axis, and a second roll angle with respect to the horizontal axis.

18. The display screen of claim 15, the reflective display screen further comprising an aluminum layer that at least partially covers the surface, and a protective layer adhered to the aluminum layer.

19. The display screen of claim 15, wherein the first mirror and the second mirror are convex mirrors, and wherein the first orientation comprises a tilt angle of +/−12.5 degrees and a roll angle of +/−20.2 degrees.

* * * * *